United States Patent
Chapman et al.

(10) Patent No.: US 7,408,578 B2
(45) Date of Patent: Aug. 5, 2008

(54) ACTIVE PIXEL WITH BUILT IN SELF-REPAIR AND REDUNDANCY

(76) Inventors: Glenn H. Chapman, 637 Ebert Avenue, Coquitlam, British Columbia (CA) V3J 2L1; Yves Audet, 6331 Avenue de Gaspe, Montreal (CA) H2S 2X8; Israel Koren, 26 Brookside Ct., Amherst, MA (US) 01002; Zahava Koren, 26 Brookside Ct., Amherst, MA (US) 01002

( * ) Notice: Subject to any disclaimer, the term of this patent is extended or adjusted under 35 U.S.C. 154(b) by 710 days.

(21) Appl. No.: 10/425,818

(22) Filed: Apr. 30, 2003

(65) Prior Publication Data

US 2004/0036788 A1    Feb. 26, 2004

Related U.S. Application Data

(63) Continuation-in-part of application No. PCT/CA01/01503, filed on Oct. 30, 2001.

(60) Provisional application No. 60/243,769, filed on Oct. 30, 2000.

(51) Int. Cl.
  *H04N 5/335* (2006.01)

(52) U.S. Cl. .................. 348/308; 348/247; 348/302; 257/292

(58) Field of Classification Search .............. 348/308, 348/246, 247, 301, 302; 257/292
See application file for complete search history.

(56) References Cited

U.S. PATENT DOCUMENTS

| | | | |
|---|---|---|---|
| 4,816,910 A * | 3/1989 | Hashimoto et al. | 348/247 |
| 5,955,753 A * | 9/1999 | Takahashi | 257/292 |
| 6,091,862 A | 7/2000 | Okisu | |
| 6,175,430 B1 | 1/2001 | Ito | |
| 6,452,153 B1 * | 9/2002 | Lauxtermann et al. | 348/302 |
| 6,542,187 B1 | 4/2003 | Hamilton, Jr. et al. | |
| 6,618,084 B1 * | 9/2003 | Rambaldi et al. | 348/247 |
| 6,674,470 B1 * | 1/2004 | Tanaka et al. | 348/302 |
| 6,801,258 B1 * | 10/2004 | Pain et al. | 348/302 |
| 6,956,605 B1 * | 10/2005 | Hashimoto | 348/301 |
| 7,009,644 B1 * | 3/2006 | Sanchez et al. | 348/247 |
| 2004/0169746 A1 * | 9/2004 | Chen et al. | 348/246 |

FOREIGN PATENT DOCUMENTS

| | | |
|---|---|---|
| EP | 0 757 476 A2 | 2/1997 |
| JP | 9331051 | 12/1997 |
| JP | 2000244823 | 9/2000 |
| WO | WO 00/51341 | 8/2000 |

* cited by examiner

*Primary Examiner*—Lin Ye
*Assistant Examiner*—Gevell Selby
(74) *Attorney, Agent, or Firm*—Oyen Wiggs Green & Mutala LLP

(57) ABSTRACT

An active pixel sensor imaging device comprises array of pixel cells, each pixel cell providing a pixel output signal to a signal output line associated therewith. Each pixel cell comprises: a photosensor having at least two independent portions, each independent portion having a sensor output; and, a separate readout circuit coupled to the sensor output of each independent portion. Each separate readout circuit has an output coupled to the signal output line and each separate readout circuit is capable of generating an output signal at the output. The outputs of the separate readout circuits for the pixel cell are connected such that the output signals are combined in an additive manner to produce the pixel output signal. Hardware and software correction methods are provided for the correction of defective pixels in monochromatic and color imaging systems.

33 Claims, 7 Drawing Sheets

ACTIVE PIXEL WITH BUILT IN SELF-REPAIR AND REDUNDANCY

CROSS-REFERENCE TO RELATED APPLICATIONS

This application is a continuation in part of and claims the benefit of Patent Cooperation Treaty application No. PCT/CA01/01503 filed on Oct. 30, 2001 and entitled "Active Pixel Sensor with Built In Self-Repair and Redundancy" and claims the benefit of U.S. application Ser. No. 60/243,769 filed on Oct. 30, 2000.

TECHNICAL FIELD

This invention pertains to the field of active pixel sensors. Particular embodiments of the invention relate to apparatus for active pixel sensors designed to be self-repairing and methods for correcting defects in active pixel sensors in which pixels have failed.

BACKGROUND

Digital cameras and other digital imaging systems are becoming widely used in both consumer and industrial applications. In remote, hard to reach and/or dangerous environments like outer space, high radiation areas, mines and military action zones, these devices offer an important ability to obtain images at low cost and risk. However, these same locations may impart much more stress on the imaging system; for example, the imaging system may be subject to increased radiation, heat and/or pressure. These types of stresses can lead to partial failures of the imaging system, especially in the image sensor elements, which occupy a significant percentage of the circuit area. At the same time, deployment of digital imaging systems in these types of areas makes it difficult or impossible to replace failed devices. In addition, enhanced reliability and reduced manufacturing cost are important for consumer applications. Hence, there is considerable advantage to creating self-repairing and correcting imaging system, that remove defects which may arise either during fabrication or during the extended lifetime of the system.

Digital imaging systems, such as digital cameras, comprise a matrix of optical sensing picture elements or "pixels". The number of pixels in the sensing area determines resolution of a captured image. However, the more pixels, the higher the probability that at least some of the pixels will fail, either during fabrication or when the pixels are later exposed to a stressful environment. Indeed, many digital cameras already employ software correction techniques to reduce the effect of errors caused by failed pixels. Such techniques involve replacing the values of failed pixels with a weighted average of light from adjacent pixels. However, such software interpolation inherently cannot give the correct value under all conditions, such as when the light intensity is changing rapidly across the image.

Furthermore, there is considerable interest in creating digital imaging systems having large area imaging sensors. For example, an imaging sensor which could cover the standard film area of a 35 mm camera would allow existing analog camera lenses to be used with a digital camera and would provide much greater resolution than current digital cameras.

Typical image sensors used in digital cameras comprise array of charged coupled devices (CCDs). From the sensor production point of view, it is difficult to fabricate error free CCD arrays on the order 36×24 mm (i.e. the standard 35 mm film frame size). Producing a CCD array of 35 mm size or larger has been done, but is very expensive. In addition, production of sensors of that size usually results in CCD arrays containing one or more defective pixels and, therefore, a correspondingly low production yield.

CCD arrays are very sensitive susceptible to failures. Since pixel data is typically passed down columns though other pixels, single pixel failures can lead to loss of whole columns of image data. CCD arrays typically require nonstandard CMOS fabrication, which tends to further increase production costs and reduce production yields. CCD arrays also typically require multiple voltages on chip for efficient charge transfer. CCD arrays having a large number of pixels also tend to have relatively slow output and high power consumption.

Active pixel sensors (APS) have recently emerged as a competitor to CCD technology in the digital imaging field. APS arrays combine arrays of photodiodes (or photogates) with some selection circuitry. APS devices have the advantage that they may be fabricated using standard CMOS fabrication technology which makes them cheaper to fabricate. While not as optically sensitive as CCD devices, APS devices may be operated using only a single voltage and can typically consume less power than CCD devices. Also because APS devices are fabricated using standard CMOS fabrication technology, they can integrate A/D converters and control circuitry on the same chip, thus lowering system costs.

In U.S. Pat. No. 5,471,515, Fossum et al describe an active pixel sensor comprising a photodiode together with readout, row-select and reset transistors. Light hitting the photodiode creates current, which charges the photodiode and the gate of the readout transistor, thus creating a gate voltage that is proportional to the illumination intensity-exposure time product. In U.S. Pat. No. 5,608,243, Chi and Bergemont disclose a variation on the standard APS cell in which the photodiode is replaced with a split gate MOS transistor with one transistor forming the detector, and the other the readout transistor. In U.S. Pat. No. 4,760,458, Bergemont and Chi disclose an APS cell which includes bipolar phototransistors.

In U.S. Pat. No. 6,043,478, Wang et al disclose an APS having a shared readout structure, where two photodiodes and their readout transistors feed into a single row-select transistor, thus cutting the number of readout columns in half.

It is know, in general, to provide a system which includes redundant elements. However, in such systems the redundant elements are not used by the system unless there is a failed element that is being replaced, hence such ideal spares add area to the system without providing useful operations unless a failure occurs.

SUMMARY OF INVENTION

This invention provides APS pixel cells which include redundancy in the pixels to overcome failures. Specific embodiments provide split APS circuits having two or more portions that normally run in parallel, each portion comprising a photodiode and a readout transistor. Using additional hardware outside of the sensor array, image processing software or both, image data may be recovered even where component devices in the APS circuit are defective. Pixels containing defective component devices may be identified using darkfield and lightfield images.

Another aspect of the invention includes improved software correction methods, which may be used in conventional APS circuits or together with the split APS circuits to provide improved estimates for defective pixels. Such software correction methods use information from nearest neighbor pixels. The software correction methods of the present invention offer improved estimation accuracy over existing averaging techniques for detecting defects in imaging systems.

Another aspect of the invention relates to software correction methods for color imaging systems. A particular pixel may be defective, because one or more of its color subpixels are defective. In accordance with the invention, output values for defective color subpixels are estimated based on information obtained from the nearest neighbor pixels and from any of the functional color subpixels within the defective pixel. The color core correction method provides improved estimate accuracy over simple interpolation based on neighboring subpixels of the same color.

One aspect of the invention relates to an active pixel sensoring device made up of a monolithic semiconductor integrated circuit substrate bearing an array of pixel cells, wherein each pixel cell provides a pixel output signal to a signal output line associated therewith. Each pixel cell of the device comprises a photosensor having at least two independent portions. Each pixel cell also has a separate readout circuit corresponding to one of the independent portions and coupled to a sensor output of its corresponding independent portion. Each separate readout circuit has an output coupled to the signal output line and is capable of generating an output signal at the output. The outputs of the separate readout circuits for the pixel cell are connected such that the output signals are combined in an additive manner to produce the pixel output signal.

Each separate readout circuit may comprise a MOS readout transistor and the sensor output of each independent portion may be coupled to the gate of the MOS readout transistor.

Each pixel cell may also comprise a row-select circuit and a reset circuit. The row-select and reset circuits may each comprise one or more MOS transistors.

The imaging device preferably comprises a controller configured to identify when the independent portions of the pixel cells are defective because they are stuck high or stuck low. The controller may be configured to compensate for defective independent portions by subtracting connection offset parameters from the pixel output signals and/or multiplying the pixel output signals by correction scaling parameters.

Another aspect of the invention relates to a method compensating for defects in an active pixel sensor imaging device. The imaging device comprises an array of pixel cells, each pixel cell having a plurality of independent portions. The compensation method comprises: exposing the array of pixel cells to one or more known illumination levels such that each pixel cell provides a pixel output signal; measuring the pixel output signals and, based upon the output signals, identifying pixel cells for which one or more of the independent portions is stuck at a high output state or a low output state.

Preferably a darkfield image is applied to the array of pixel cells. For each of the pixel cells, the darkfield illumination value of the pixel output signal may be measured and an offset parameter may be determined which, when subtracted from the darkfield illumination value, results in a zero signal. Those pixel cells having offset parameters which are not near zero may be identified as pixel cells having one or more independent portions stuck at high output states.

Preferably, a lightfield image is applied to the array of pixel cells. For each of the pixel cells, a lightfield illumination value of the pixel output signal may be measured and a scaling parameter may be determined which, when multiplied with the lightfield illumination value, results in a maximum sensor output. Those pixel cells having lightfield illumination values that are not near the maximum sensor output may be identified as having one or more independent portions stuck at low output states.

For each pixel cell having at least one properly functioning independent portion and at least one defective independent portion stuck in a high output state or a low output state, a corrected pixel output signal may be generated by subtracting the offset parameter associated with the pixel cell from the pixel output signal to produce a resultant signal; and, multiplying the resultant signal by the scaling parameter associated with the pixel cell.

Another aspect of the invention involves correcting defective subpixel values. Where the array of pixel cells of an imaging device comprises an array of composite color pixels, with each composite color pixel comprising at least one each of red, green and blue subpixels and wherein there is at least one defective composite color pixel having a defective subpixel, the value of the defective subpixel may be estimated by: determining a set of color coordinates for each of a plurality of composite color pixels neighboring the defective composite color pixel; individually interpolating an estimated set of color coordinates for the defective composite color pixel based on the color coordinates for the composite color pixels neighboring the defective composite color pixel; and, determining a value for the defective subpixel based on the estimated set of color coordinates and a value of at least one functional subpixel within the defective composite color pixel.

BRIEF DESCRIPTION OF DRAWINGS

In drawings which depict non-limiting embodiments of the invention.

DESCRIPTION

Throughout the following description specific details are set forth in order to provide a more thorough understanding of the invention. However, the invention may be practiced without these particulars. In other instances, well known elements have not been shown or described in detail to avoid unnecessarily obscuring the present invention. Accordingly, the specification and drawings are to be regarded in an illustrative, rather than a restrictive, sense.

Figure 1:
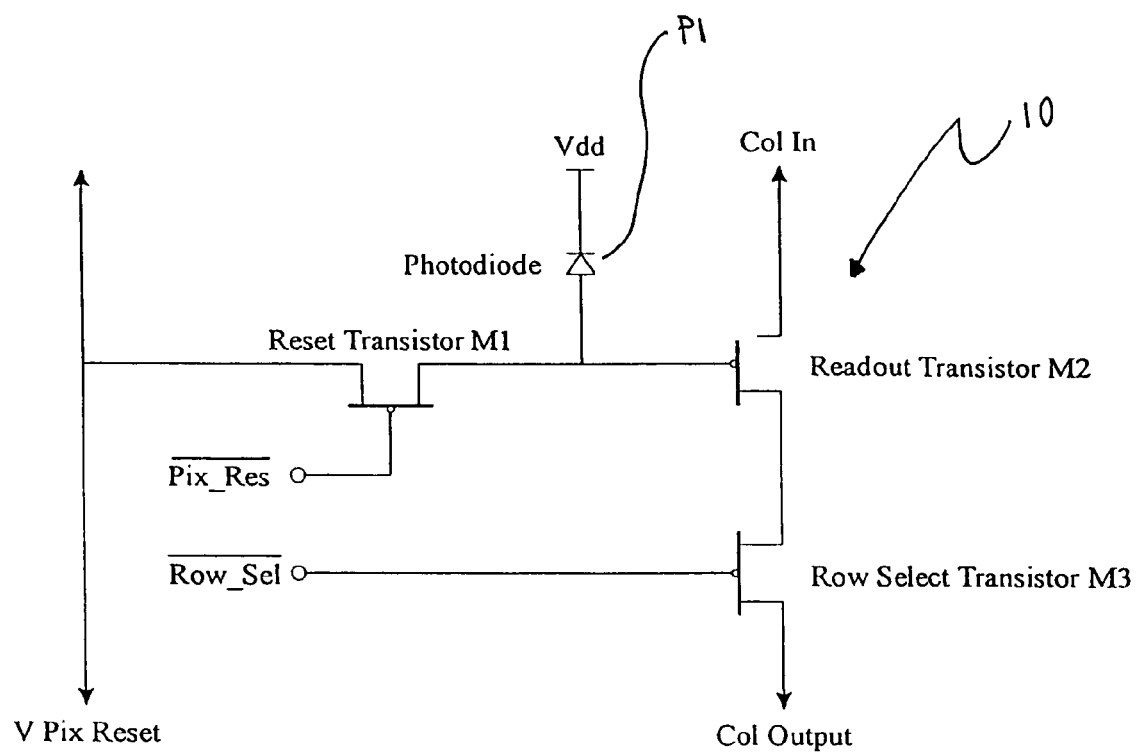
FIG. 1 is a partial schematic representation of a prior art APS cell.

FIG. 1 shows the basic components of a prior art APS circuit 10 as it is typically implemented. APS circuit 10 comprises a photodiode P1, plus reset, readout and row-select transistors (respectively, M1, M2, M3). In a typical digital imaging system (not shown), a plurality of APS circuits having components similar to those of APS circuit 10 are arranged in a matrix of rows and columns. Each APS circuit 10 represents a particular pixel. Because of this relationship between APS circuits and their corresponding pixels, APS circuits are referred to throughout this description and the accompanying claims interchangeably as "APS circuits", "APS cells", "APS pixel cells" and simply "pixels".

As APS circuit 10 is relatively simple, its operation will be described in detail. For a typical digital imaging system comprising a matrix of pixels arranged in columns and rows, an operational cycle is performed on all of the pixels of a given row at one time and all of the rows of the matrix are accessed sequentially until the entire matrix is covered. However, those skilled in the art will recognize that other operational sequences and/or cycles are possible.

APS circuit 10 comprises reset transistor M1, which facilitates an optional pre-charging process prior to capturing image data. In the pre-charging process, reset transistor M1 is activated, so that photodiode P1 and the gate of readout transistor M2 are reset to the V_Pix_Reset line voltage. In the illustrated embodiment, the pre-charging process will typically remove charge from the gate of readout transistor M2. Resetting the gate of readout transistor M2 to the V_Pix_Reset line voltage provides APS circuit 10 with increased image sensitivity by biasing readout transistor M2 such that its operation is in a linear output region. Again, all the of the APS circuits in a particular row are typically pre-charged at the same time and to the same V_Pix_Reset line voltage. Those skilled in the art will recognize that some APS-based digital imaging systems may not incorporate a pre-charging process and that some APS circuits may not include the corresponding pre-charging circuitry.

After resetting all of the APS circuits in the digital imaging system, the matrix of pixels is exposed to the light being detected. In each APS circuit 10, the light impinging on photodiode P1 creates current which charges the combined capacitance of photodiode P1 and the gate of readout transistor M2. This charge creates a voltage (referred to as the "photovoltage") at the gate of readout transistor M2. The photovoltage at the gate of readout transistor M2 is proportional to the illumination intensity-exposure time product and is retained during the subsequent readout cycle.

The readout cycle involves extracting information from each APS circuit 10 by activating its corresponding row-select transistor M3. When row-select transistor M3 is activated, the photovoltage at the gate of readout transistor M2 causes a current to flow down the Col_Output line. This current, which is related in a predictable manner to the photovoltage at the gate of readout transistor M2, flows through the Col_Output line to a sense amplifier (not shown) and then through other circuitry (not shown) which converts the output of the Col_Output line to a digital image output value.

In the context of a digital imaging system, the readout cycle typically involves simultaneously "reading out" information from all of the APS circuits in a given row of the pixel matrix by simultaneously activating the row-select transistors M3 for all of the APS circuits in that row. Each APS circuit in that row then outputs to its corresponding Col_Output line in parallel. After sequentially reading out all of the rows of pixels in this manner, the digital imaging system resets itself in preparation for another image by resetting the gate of readout transistor M2 back down to the V_Pix_Reset line voltage in the pre-charging process described above.

Figure 2:
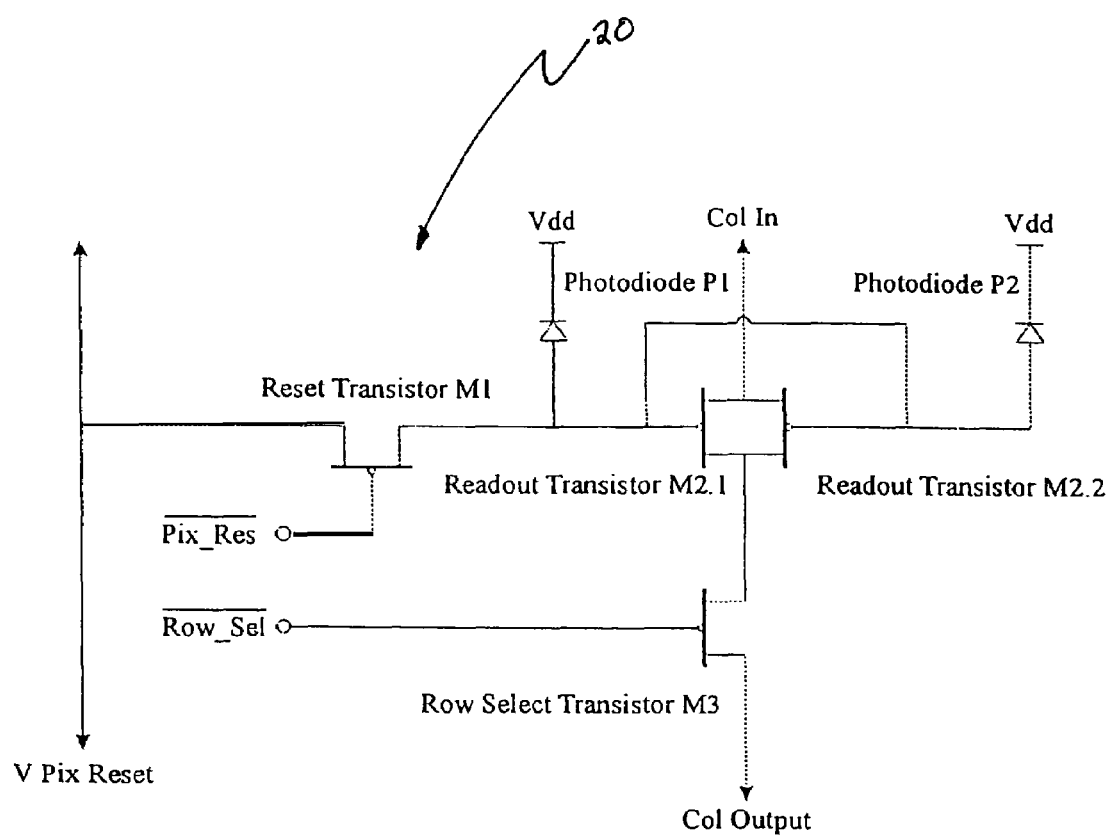
FIG. 2 is a partial schematic representation of a split APS circuit according to a particular embodiment of the invention.

FIG. 2 depicts a partial schematic representation of a split APS circuit 20 according to a particular embodiment of the present invention. As will be explained in further detail below, split APS circuit 20 comprises two independent portions, which provide redundancy and which allow for correction of some types of defects that may occur either at fabrication time or over the operational lifetime of the imaging device. Split APS circuit 20 comprises a pair of independently operable photodiodes P1, P2 configured in parallel and a corresponding pair of readout transistors M2.1, M2.2. Preferably, photodiodes P1, P2 are fabricated to have activation regions that are approximately the same size. The size of the activation regions of the photodiodes P1, P2 of split APS circuit 20 may be approximately half of the size of the activation region of the photodiode P1 of conventional APS circuit 10 (FIG. 1). The size of readout transistors M2.1, M2.2 may be similarly reduced.

Digital imaging systems incorporating the concepts of the invention (not shown) comprise a plurality of split APS circuits arranged in a matrix of rows and columns, with each split APS circuit having components similar to those of split APS circuit 20. Each split APS circuit 20 represent a particular pixel. As in the case of prior art APS-based digital imaging systems, operational cycles for digital imaging systems incorporating the concepts of the present invention are preferably performed on all of the pixels of a given row at one time and all of the rows of the matrix are accessed sequentially until the entire matrix is covered. However, those skilled in the art will recognize that other operational sequences and/or cycles are possible. For example, a particular operational cycle may occur simultaneously for all of the individual APS circuits of the APS matrix or for various groups of proximate APS circuits within the APS matrix.

The operation of split APS circuit 20 and digital imaging systems incorporating split APS circuit 20 is generally similar to that of conventional APS circuit 10 (FIG. 1). In split APS circuit 20, however, each photodiode P1, P2 separately directs current in parallel to the gate of its corresponding readout transistor M2.1, M2.2.

Split APS circuit 20 incorporates reset transistor M1, which facilitates an optional pre-charging process prior to capturing image data. In the pre-charging process, reset transistor M1 is activated to reset photodiodes P1, P2 and the gates of their corresponding readout transistors M2.1, M2.2 to the V_Pix_Reset line voltage. In the illustrated embodiment, the pre-charging will typically remove charge from the gate of readout transistors M2.1, M2.2. Resetting the gates of readout transistors M2.1, M2.2 to the V_Pix_Reset line voltage provides split APS circuit 20 with increased image sensitivity by biasing readout transistors M2.1, M2.2 such that their operation is in a linear output region. Again, all of the APS circuits in a particular row are preferably pre-charged at the same time and to the same V_Pix_Reset line voltage. Those skilled in the art will recognize that some APS-based digital imaging systems may not incorporate a pre-charging process and that some APS circuits may not include the corresponding pre-charging circuitry.

After pre-charging all of the APS circuits in the digital device, the matrix of pixels is exposed to the light or other radiation to be detected. In each APS circuit 20, the light impinging on photodiodes P1, P2 creates current. The current created in photodiode P1 charges the combined capacitance of photodiode P1 and the gate of readout transistor M2.1. Similarly, the current created in photodiode P2 charges the combined capacitance of photodiode P2 and the gate of readout transistor M2.2. The currents create photovoltages on the gates of readout transistors M2.1, M2.2 which are proportional to the illumination intensity-exposure time product. After exposure, the photovoltages at the gates of readout transistors M2.1, M2.2 are retained during the subsequent readout cycle.

The readout cycle involves extracting information from each APS circuit 20 by activating its corresponding row-select transistor M3. When row-select transistor M3 is activated, the photovoltages at the gates of readout diodes M2.1, M2.2 cause parallel current flow through readout transistors M2.1, M2.2 which is claimed to provide a current in the Col_Output line. The current through each readout transistor M2.1, M2.2 is related in a predictable manner to the photovoltage at the gate of that transistor and, since row-select transistor M3 is in series with each readout transistor M2.1, M2.2, the current in the Col_Output line is the sum of the currents through readout transistors M2.1, M2.2. The current in the Col_Output line typically flows to a sense amplifier (not shown) and then through other circuitry (not shown) which converts the output of each column to a digital image value.

In the context of a digital imaging system, the readout cycle typically involves simultaneously "reading out" information from all of the split APS circuits in a given row of the pixel matrix by simultaneously activating the row-select transistors M3 for all of the APS circuits in that row. Each split APS circuit in that row then outputs to its corresponding Col_Output line in parallel. After sequentially reading out all of the row of pixels in this manner, the digital imaging system resets itself in preparation for another image by resetting the gates of readout. transistors M2.1, M2.2 back down to the the V_Pix_Reset line voltage in the pre-charging process described above.

Preferably, as discussed above photodiodes P1, P2 and readout transistors M2.1, M2.2 are reduced in size as compared to photodiode P1 and readout transistor M2 or the conventional APS circuit 10 (FIG. 1). The size and/or other parameters of the component devices of split APS circuit 20 may be designed, such that the combination of current produced by photodiodes P1, P2 and readout transistors M2.1, M2.2 in the Col_Output line will be approximately the same as that generated in the conventional APS circuit 10. For example, this condition may be achieved approximately when photodiodes P1, P2 and readout transistors M2.1, M2.2 are about half the size of the corresponding devices (i.e. photodiode P1 and readout transistor M2) of conventional APS circuit 10 (FIG. 1).

Photodiode P1 functions together with readout transistor M2.1 and photodiode P2 functions together with readout transistor M2.2. Photodiode P1 with readout transistor M2.1 and photodiode P2 with readout transistor M2.2 are referred to in this description as the two "portions" of split APS circuit 20.

The above description of the operation of digital imaging systems incorporating split APS circuit 20 assumes that all of the component devices for both portions are working properly. However, since each portion of split APS circuit 20 operates independently, the failure of any or all of the component devices of one portion does not affect the operation of the other portion. For example, if photodiode P1 is defective and outputs no signal, then the combination of photodiode P2 and readout transistor M2.2 will still generate a current signal in the Col-Output line, although this current signal will be somewhat reduced.

In preferred embodiments, the sizes and other parameters of the component devices in each portion of APS circuit 20 (i.e. photodiodes P1, P2 and readout transistors M2.1, M2.2) are substantially the same. In such embodiments, if one portion of split APS circuit 20 is completely defective and generates no signal, then the current generated by the functioning portion of APS circuit 20 will be approximately half of what the current would be if split APS circuit 20 was completely functional. In practice, the current from one functional portion of a split APS circuit 20 may not be exactly half of what is expected from a fully functional APS circuit 20, because the illumination of each photodiode P1, P2 may not be identical or the parameters of the component devices in each portion of the APS circuit 20 may not be identical.

Because of variations in parameters of component devices, the output current of each individual split APS circuit 20 may differ from other split APS circuits for the same light input. As such, digital imaging systems incorporating split APS circuit 20 must be calibrated, such that the output value for each pixel (i.e. each split APS circuit 20) will be substantially equal for a given light input. This process is commonly referred to as "normalization". It is assumed for the purpose of this explanation, that normalization calibration is performed on the output values of each APS circuit after they have been digitized. Those skilled in the art will appreciate that certain aspects of the normalization calibration process may be performed in the analog domain.

Normalization calibration is performed using two procedures referred to a "darkfield image" and a "lightfield image". In the darkfield image, the entire pixel matrix is located in an environment without any light or radiation and the output value for each APS circuit is recorded. The expected darkfield image output value of a functional APS circuit is near zero, with the only output created by noise. The darkfield image output value for each APS circuit provides a normalization offset for that APS circuit. For example, if the darkfield image output value for a particular APS circuit is 0.024, then the normalization offset for that APS circuit will be 0.024. In subsequent operation of the imaging system, when a desired image is obtained, the normalization offset for each APS circuit is subtracted from its image output value to remove the contribution of noise from the resultant image data for that APS circuit.

In the lightfield image, the entire pixel matrix is located in an environment where the imaging system is fully illuminated to light levels which should provide a maximum output current for the average APS circuit. The lightfield image output value of each APS circuit is recorded and provides an indication of the sensitivity of the particular APS circuit to illumination. The expected lightfield image output value is near the maximum output value for a given APS circuit, which may reflect the saturation currents of the component devices, for example.

When the lightfield image output value is obtained, the normalization offset is first subtracted to remove the effect of noise and then a normalization scaling factor is determined which will bring the lightfield output image value to a predefined maximum output level. For example, if the predefined maximum output level is 1.0, but that the lightfield image output value for a particular APS circuit (after subtraction of the normalization offset) is only 0.9, then the normalization scaling factor for that particular APS circuit will be 1.111. Similarly, if the lightfield image output value for a particular APS circuit (after subtracting of the darkfield image output value) is only 0.85, then the normalization scaling factor for that particular APS circuit will be 1.176.

In subsequent operation of the imaging system, when a desired image is obtained, the image output values for each APS circuit are normalized with a two step procedure, which involves: (i) subtracting, from the image output value, the normalization offset associated with that particular APS circuit (as determined from the darkfield image); and then (ii) scaling the resultant image output value by multiplying the resultant image output value by the normalization scaling factor associated with that particular APS circuit (as determined from the lightfield image).

Most of the space occupied by APS circuits is taken up by their photodiodes and their readout transistors (see FIGS. 1 and 2). Consequently, their photodiodes and readout transistors represent the most likely failure areas for these APS circuits. As will be explained in greater detail below, information obtained from the darkfield and lightfield images may be used to identify failed photodiodes and/or readout transistors. Where defects are detected in a split APS circuit 20 (FIG. 2), information obtained from the darkfield and lightfield images may also be used as the basis for a hardware correction method which remedies the defect.

Three common failure modes exist for APS circuits which comprise a photodiode combined with a readout transistor:
(1) reduced (or otherwise changed) sensitivity and/or low output signal—This failure mode may occur, for example, because of something covering part of the photodiode, leakage in the photodiode, poor readout transistor transfer characteristics, or radiation induced changes in local readout transistor characteristics.
(2) stuck low—This failure mode occurs when the readout transistor passes no current. This failure mode may be caused, for example, by a short circuited photodiode, a cut in the current path between the photodiode and the gate of the readout transistor or a non-functional readout transistor.
(3) stuck high—This failure mode represent a pixel that is always stuck at some value above zero. This failure mode occurs, for example, when the readout transistor is always on.

Reduced sensitivity and/or low output signal (i.e. failure mode (1)) is similar to the general problem of pixel sensitivity variation over the matrix of APS circuits contained in a digital imaging system. As such, digital imaging systems comprising conventional APS circuits 10 (FIG. 1) or split APS circuits 20 (FIG. 2) may be able to overcome defects in failure mode (1) using an offset detected from the darkfield image and a scaling factor determined from the lightfield image. However, when a conventional APS circuit 10 is stuck high or low (failure modes (2) and (3)), it will provide no useful information. As such, digital imaging systems comprising conventional APS circuits 10 must rely on relatively inaccurate software correction methods based on the output values of the nearest neighboring pixels to overcome defects in failure modes (2) and (3). On the other hand, split APS circuit 20 has an important advantage in that if only one portion of the circuit suffers a defect, the remaining functional portion will continue to provide useful data. Thus, digital imaging systems comprising split APS circuits 20 may also be able to overcome defects in failure modes (2) and (3) without resorting to inaccurate software correction methods.

Assuming that both portions of split APS circuit 20 are fabricated from substantially similar devices and that when both portions of split APS circuit 20 are functional, the minimum circuit output is 0.0 and the maximum output circuit output is 1.0, then there are 6 possible cases:
(1) both pixels active and functioning normally—This case represents normal operation with full pixel sensitivity over an output range of 0.0-1.0;
(2) one portion stuck low—In this case, one portion of split APS circuit 20 is producing no output current and there is only half pixel sensitivity with an output range of 0.0-0.5;
(3) one portion stuck high13 In this case, one portion of split APS circuit 20 is always outputting the maximum current and there is only half pixel sensitivity with an output range of 0.5-1.0;
(4) both portions stuck low—This case is a dead pixel with a constant output near 0.0;
(5) both portions stuck high—This case is a dead pixel with a constant output near 1.0; and
(6) one portion stuck low, one portion stuck high—This case is a dead pixel with a constant output near 0.5.

All of these cases may be recognized and identified using the lightfield and darkfield images. When a split APS circuit 20 is determined to be defective, its location (row and column position) may be recorded for further correction by hardware or software techniques as described in more detail below.

Where both portions of a split APS circuit 20 are working normally, the output value of the split APS circuit 20 will be near 0.0 during the darkfield image, and near 1.0 during the lightfield image. Such fully functional APS circuits require no further processing other than normal normalization corrections described above.

The lightfield image may identify split APS circuits 20 having one portion stuck low (case (2)). Where one portion of a split APS circuit 20 is stuck low, a lightfield test will result in an output current of approximately half of the expected lightfield illumination value. As explained in more detail below, the inherent redundancy of split APS circuit 20 allows for hardware-based correction of defects where only one portion of a split APS circuit 20 is stuck low.

The lightfield image may also identify split APS circuits 20 having both portions stuck low (case (4)). Where both portions of a split APS circuit 20 are stuck low, the output current will be near zero even during the lightfield image. Such pixels are dead pixels which cannot be remedied using hardware correction techniques. As discussed in greater detail below, some aspects of the invention provide improved software correction methods which may be used to estimate values for pixels where both portions of the split APS circuit are stuck low.

The darkfield image may identify split APS circuits 20 having one portion stuck high (case (3)). In a darkfield image, the expected output of a functional split APS circuit 20 is near zero, with the only output being created by noise. Where one portion of a split APS circuit 20 is stuck high, however, a darkfield test will result in an output current that is significantly higher than zero. As explained in more detail below, the inherent redundancy of split APS circuit 20 allows for hardware-based correction of defects where only one portion of a split APS circuit 20 is stuck high.

The darkfield image may also identify split APS circuits 20 having both portions stuck high (case (5)). Where both portions of a split APS circuit 20 are stuck high, the output current will be near 1.0 even during the darkfield image. Such pixels cannot be remedied by hardware correction techniques. However, it is preferable to identify APS circuits suffering from this defect and to record their darkfield output values. Later, during operation, these darkfield output values may be subtracted fromt he image output values for these APS circuits to bring there image output down to zero. An nonfunctional pixel having an output value of zero is preferable to a non-functional pixel having an output value near 1.0. As discussed in greater detail below, some aspects of the invention provide improved software correction methods which may be used to estimate values for pixels where both portions of the split APS circuit are stuck high.

Together, the lightfield image and the darkfield image may identify split APS circuits 20 where one portion is stuck high and the other portion is stuck low (case (6)). In such cases, the output of the APS circuit will be approximately 0.5 for both the lightfield image and the darkfield image. This output level is too high for the darkfield image output of a normally operating APS circuit and too low for the lightfield image output of normally operating APS circuit. Pixels having this type of defect cannot be remedied by hardware correction methods. As with the case of pixels where both portions of the APS circuit 20 are stuck high (case (5)), it is preferable to measure and record the darkfield output level of APS circuits 20 where one portion is stuck high and the other portion stuck low. Later, during operation, the darkfield output level may be subtracted as an offset to bring the image output value of the defective APS circuit to zero. As discussed in greater detail below, some aspects of the invention provide improved software correction methods which may be used to estimate values for pixels where one portion of the split APS circuit is stuck high and the other portion is stuck low.

The inherent redundancy of split APS circuit 20 allows for hardware-based correction methods in the cases where one portion of an APS circuit is stuck low (case (2)) or where one portion of an APS circuit is stuck high (case (3)). The simplest case for hardware correction is where both portions of a split APS circuit are identical and one of the portions of the APS circuit is stuck low (case (2)), such that it provides no current. In such a case, the corrected output value for the defective split APS circuit 20 may be obtained by simply multiplying the actual output value by a scaling correcting factor of 2. In practice, however, the two portions of the split APS circuit 20 are not likely to be exactly identical, so the scaling correction factor will be close to but not exactly 2. In addition, there may be some offset correction parameter (i.e. determined from the darkfield test) that must be subtracted from the actual output value prior to scaling.

In general, hardware-based correction for a split APS circuit 20 with one portion stuck low (case (2)) is really a special case of the APS circuit normalization calibration described above. An offset correction parameter is determined for the split APS circuit 20 by recording the output of the circuit during a darkfield image. This offset correction parameter may result from noise and/or leakage from the defective portion of the split APS circuit 20. During subsequent use, this offset calibration parameter is subtracted from output image data. A scaling correction parameter is determined for the split APS circuit 20 by recording the circuit's lightfield output, subtracting the offset correction parameter and then determining the scaling correction parameter required to scale the output of the split APS circuit 20 to its maximum value. Typically, where one portion of the split APS circuit 20 is stuck low, the scaling correction parameter will be greater than the scaling normalization factor of a fully functional APS circuit.

Correction of a split APS circuit 20 having one portion stuck high (case (3)) involves substantially the same procedure as where one portion of the split APS circuit 20 is stuck low. However, in the case of a split APS circuit 20 where one portion is stuck high, the offset correction parameter (determined during the darkfield image) will be relatively high because of the output from the portion of the split APS circuit 20 that is stuck high. The scaling correction parameter is determined by recording the circuit's lightfield output, subtracting the offset correction parameter and then determining the scaling correction parameter required to scale the output of the split APS circuit 20 to its maximum value. Once again, the scaling correction parameter will typically be greater than the scaling normalization factor of a fully functional APS circuit.

In subsequent operation of the imaging system, when a desired image is obtained, the image output values for the split APS circuit 20 having one defective portion (i.e. one portion stuck low (case (2)) or one portion stuck high (case (3))) are corrected with a two step procedure, which involves: (i) subtracting the offset correction parameter from the image output value; and then (ii) scaling the resultant image output value by multiplying the resultant image output value by the scaling correction parameter.

Where split APS circuits have one defective portion, correction of the image output values (i.e. subtraction of the offset parameter and multiplication by the scaling correction parameter) is preferably performed on digital image output values. Such correction is preferably applied to the digital image output values by a controller, which may comprise, for example, an embedded microprocessor, a stand alone programmable controller, a DSP chip, a computer or the like. In alternative embodiments, subtraction of the offset parameter and multiplication by the scaling correction parameter may be performed on analog image output values using appropriate analog circuitry. For these reasons, correction of the image output values of split APS circuits having one defective portion by offset subtraction and scaling is referred to in this description and in the accompanying claims as "hardware correction" or "hardware-based correction".

In further alternative embodiments, hardware-based correction of split APS circuits having one defective portion may be performed using specialized hardware components. For example, scaling by a scaling correction parameter may be performed in a shift register. Where a split APS circuit comprises two identical portions and one of the portions is completely defective, then the resulting image output signal (after offset correction) would be approximately one half of the image output signal of a fully functional split APS circuit. In such a case, scaling correction may be preformed in a shift register by shifting the digital image output value of the half-defective APS circuit to one bit higher (i.e. a shift of one bit to the left). A leftward shift of one bit is effectively the same as a multiplication by 2. It should be noted that scaling in this manner results in a reduction in accuracy of the digital image output value, because the resultant digital image output value (i.e. after scaling) has an uncertainty in its least significant bit. However, where the number of bits used to digitized the digital image output value is greater, the reduction in accuracy caused by scaling will be reduced.

In general, the correction scaling and/or correction offset parameters used for hardware-based correction of split APS circuits having one defective portion may vary to some degree with device or circuit parameters. In such cases, knowledge of the variation of the correction scaling and/or correction offset parameters may be obtained by comprehensive calibration and measurement over a range of operating conditions or by circuit simulation and the correction parameter(s) may be suitably adjusted.

For example, the inventors have determined that the correction scaling parameter may vary as a weak function of the photodiode current in the functional portion of the split APS circuit. Although typically the correction scaling parameter varies with the photodiode current over a range of approximately 3-7%, the variation may be a larger or smaller percentage.

The inventors have also determined that the variation of the correction scaling and/or correction offset parameters with device or circuit parameters (e.g. photodiode current) may differ between the one portion stuck low condition (case (2)) and the one portion stuck high condition (case (3)). In one particular experimental embodiment, a CMOS 0.35 micron split APS circuit was designed with each portion having identical component devices fabricated in an n-doped well. With a split APS circuit having identical component devices in each portion, the expected correction scaling parameter would be approximately 2. The correction scaling parameter for the one portion stuck low condition (case (2)) was found to vary from 1.98 for low photodiode currents to 2.01 for photodiode currents near the saturation limit (i.e. a range of approximately 1.5%). By comparison, for the one portion stuck high condition (case (3)), the correction scaling parameter varied from 1.85 for low photodiode currents to 1.92 for photodiode currents near the saturation limit (i.e. a range of approximately 3.7%).

Simulations have shown that the correction scaling parameter also varies modestly with variations in the threshold voltage of the readout transistors. For example, in the above-discussed CMOS 0.35 micron split APS circuit comprising portions with identical component devices fabricated in an n-doped well, simulations have shown variations in the correction scaling parameter of about 20-35% of the variation in the readout transistor threshold voltage.

The hardware-based correction methods discussed above can be varied to accommodate these types of variations in the correction scaling and/or the correction offset parameters. For example, each failure mode can be represented in a formula or lookup table, which relates the image output value of the surviving portion of the split APS circuit to the expected correction scaling parameter. The relationships between the image output value of the surviving portion of the APS circuit and the expected correction scaling parameter may be obtained, for example, by circuit simulation or by measurements on actual circuits over a range of image output values.

The examples presented above relate to the variation of the correction scaling parameter with photodiode current or readout transistor threshold voltage. Those skilled in the art will appreciate that other device and/or circuit parameters may cause variation in the correction scaling parameter and that these variations may also be accommodated using lookup tables or formulas similar to those discussed above. The examples presented above also relate to variations in the correction scaling factor with device and/or circuit parameters. Those skilled in the art will appreciate that the correction offset factor may also vary with device and/or circuit parameters and that variation of the correction offset parameter may be accommodated using lookup tables or formulas similar to those discussed above.

Split APS circuit 20 together with the hardware correction methods discussed above provide a functional pixel for three cases (i) where split APS circuit is fully functional (case(1)); (ii) where a portion of split APS circuit 20 is stuck low (case (2)); and (iii) where a portion of split APS circuit 20 is struck high (case (3)). However, even with hardware correction, split APS circuit 20 cannot, by itself, correct for cases where there are defects in both portions of split APS circuit 20 (i.e. cases (4), (5) and (6)).

The component devices in each portion of a split APS circuit 20 are preferably fabricated to be small in comparison to the component devices of a conventional APS circuit 10 (FIG. 1). As such, the component devices of a split APS circuit 20 are less prone to failure that the corresponding component devices in a conventional APS circuit 10. The failure of a single portion of a split APS circuit 20 (i.e cases (2) and (3) above) is a relatively rare event. The probability of failure in both portions of the same split APS circuit 20 (i.e. cases (4), (5) and (6) is significantly smaller. For a fully random process, the statistical probability of failure in both portions of a split APS circuit 20 would be approximately the square of the probability of a failure in a single portion. Computation of the exact statistics may be more complex than described above, but simulations clearly demonstrate that failure of both portions of a split APS circuit 20 is an extremely rare event.

Figure 3:
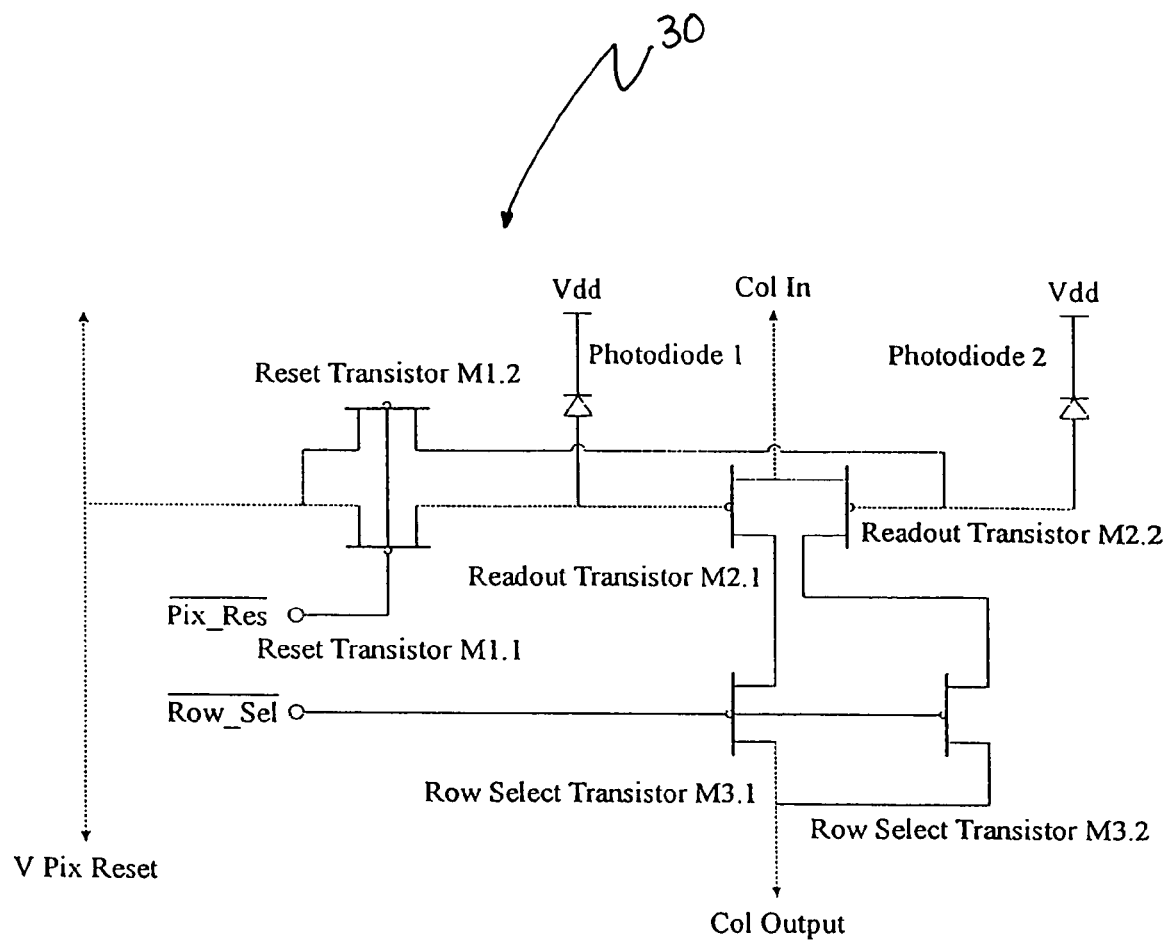
FIG. 3 is a partial schematic representation of a split APS cell according to another embodiment of the invention.

FIG. 3 schematically depicts an alternative split APS circuit 30, which may help to prevent and/or reduce the frequency of error cases (4), (5) and (6) where both portions of the APS circuit are defective. Split APS circuit 30 comprises two completely independent "portions" by providing a pair of independent reset transistors M1.1, M1.2 and a pair of independent row select transistors M3.1, M3.2. The first "portion" of split APS circuit 30 comprises photodiode P1, readout transistor M2.1, reset transistor M1.1 and row-select transistor M3.1. Similarly, the second "portion" of split APS circuit 30 comprises photodiode P2, readout transistor M2.2, reset transistor M1.2 and row-select transistor M3.2.

In operation, reset transistors M1.1, M1.2 independently reset/pre-charge their corresponding photodiodes P1, P2 and the gates of their corresponding readout transistors M2.1, M2.2 to the V_Pix_Reset voltage level. Imaging is performed in the same manner is in split APS circuit 20, with photodiodes P1, P2 receiving radiation from the environment being imaged and creating corresponding photovoltages on the gates of readout transistors M2.1, M2.2. After imaging, row-select transistors M3.1, M3.2 are independently activated to cause current flow through their respective readout transistors M2.1, M2.2 which is combined in the Col_Output line.

The provision of independent reset transistors M1.1, M1.2 and independent row-select transistors M3.1, M3.2 is advantageous because, if a defect occurs in any one reset transistor M1.1, M1.2 or in any one row-select transistor M3.1, M3.2, the other portion of APS circuit 30 will still function to provide useful image output values as discussed above. A second advantage of having two independent reset transistors M1.1, M1.2 is that each photodiode P1, P2 may be separately reset and pre-charged.

Despite the redundant nature of split APS circuits 20, 30 and the hardware correction methods discussed above, there may still be circumstances where there is a failure of both portions of a split APS circuit (i.e. cases (4), (5) and (6)). In these cases, the image output value of the defective pixel is estimated using software correction methods, typically based on the neighboring pixels.

Figure 4:
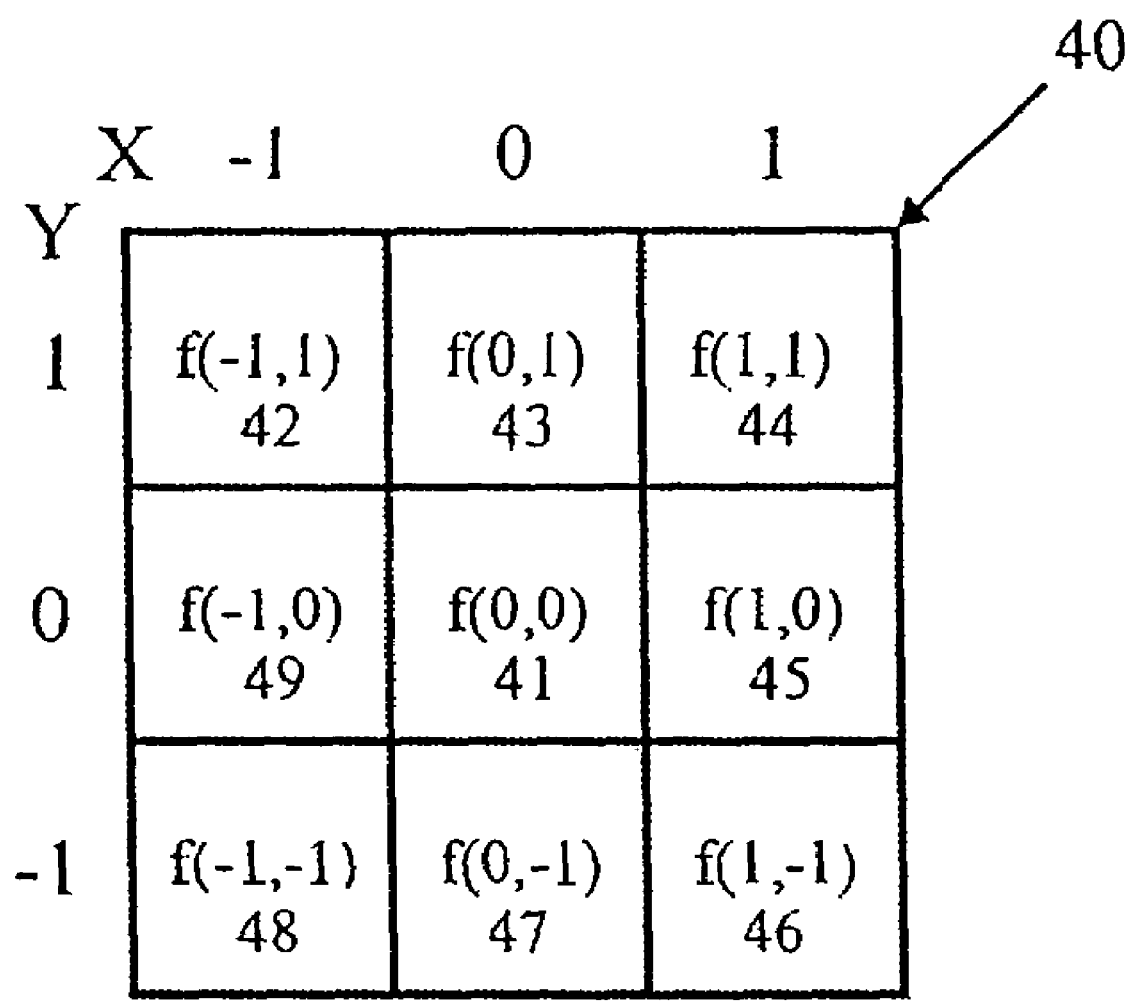
FIG. 4 is a schematic partial representation of a pixel layout in a digital imaging system according to one embodiment of the invention; and, FIG. 5 is a schematic partial representation of a color pixel layout in a color digital imaging system according to one embodiment.

FIG. 4 schematically depicts a 3 by 3 pixel square 40, wherein a failed pixel 41 is surrounded by its eight nearest neighbor pixels 42-49. FIG. 4 incorporates a coordinate system where pixels 41-49 are assigned x and y coordinates, with failed pixel 41 having coordinate x=0, y=0 and neighbor pixels 42-49 having x and y coordinates ranging from −1 to +1. Estimates of the output value for failed pixel 41 may be computed by simply averaging values of neighboring pixels 42-49. For example if f(x,y) is the output value of the pixel with coordinates x,y, then an estimate of the output value of failed pixel 41 using a simple average of the eight nearest neighbors would be $$f(0,0) \sim [f(-1,-1)+f(-1,0)+f(-1,1)+f(0,-1)+f(0,1)+f(1,-1)=f(1,0)+f(1,1)]/8 \qquad \text{Equation (1)}$$

Those skilled in the art will appreciate that other averages can may be performed with other numbers of neighboring pixels (e.g. the 4 and 24 nearest neighboring pixels).

Software correction involving averaging techniques similar to that of equation (1) or more sophisticated averaging techniques, such as weighted averaging, works well when the spatial variation of image intensity varies relatively smoothly and slowly; however, such software correction generates relatively poor estimates when the image intensity charges rapidly from pixel to pixel. More importantly, software correction produces a poor result in the case where there are two failed pixels adjacent to each other.

One aspect of the invention involves a superior software correction method which provides generally better estimates for defective pixels than software correction based on averaging. In accordance with a particular embodiment of the software correction method, defective pixel 41 and its neighboring pixels 42-49 are assumed to follow a second order equation. Recalling the coordinate system used in FIG. 4, the he software correction method starts with a Taylor series expansion of f(x,y), with all of the terms higher than second order removed, to provide:

$$f(x,y)=a(00)+a(10)x+a(01)y+a(20)x^2+a(11)xy+a(02)y^2+a(21)x^2y+a(12)xy^2+a(22)x^2y^2 \quad \text{Equation (2)}$$

where the a's are the coefficients of the Taylor series expansion. The software correction method involves obtaining these Taylor series coefficients by fitting equation (2) to the 9 pixel values, forming 9 equations in 9 unknowns. In the case where pixel 41 is completely defective, however, there is no information about pixel 41 (i.e. f(0,0)). Accordingly, there is 8 equations and 9 unknowns and one of the Taylor the coefficients cannot be calculated precisely. In accordance with the preferred embodiment of the software correction method, the coefficient a(22) is estimated. Several possibilities exist for estimating the relationship between the central a(22) coefficient and the other coefficients. Studies have shown that one effective method is to assume the a(22) coefficient is zero. Such an assumption is equivalent to assuming a second order equation on each edge of the 3×3 pixel square 40 whose second order terms vary linearly from one side to the other. When a(22)=0, is substituted into equation (1) and the other Taylor series coefficients are solved for in terms of the pixel output values (f(x,y)), it can be shown that an accurate estimate for the missing central pixel f(0,0) is provided by:

$$f(0,0) \sim [f(0,1) + f(0,-1) + f(1,0) + f(-1,0)]/2 - [f(1,1) + f(-1,1) + f(1,-1) + f(-1,-1)]/4 \quad \text{Equation (3)}$$

Extensive experimentation on many real images has shown that the approximation formula of equation (3) almost always provides a significantly better estimate for the output value of the missing central pixel (f(0,0)) than the simple averaging technique of equation (1).

Those skilled in the art will appreciate that the software correction algorithm involving Taylor series expansion (i.e. equations (2) and (3)) may be extended or varied. For example, equation (3) may be altered by making other choices about the relationship of the value a(22) to the other coefficients. Equations (2) and (3) may also be expanded to include more neighbors (e.g,. a 5×5 pixel set). Also, equation (3) may be rewritten for the case where the defective pixel is an edge pixel rather than the central pixel. Such a variation of equation (3) may be useful for correcting adjacent failed pixels by using 3×3 neighbors to the left, right, above and below the pixels. Simple averaging of the form of equation (1) does not provide a solution for the case where a pair of adjacent pixels are defective.

Software correction algorithm having the form of equation (3) may be applied to conventional APS circuits 10 (FIG. 1) or to split APS circuits 20, 30 (FIGS. 2, 3).

Figure 6:
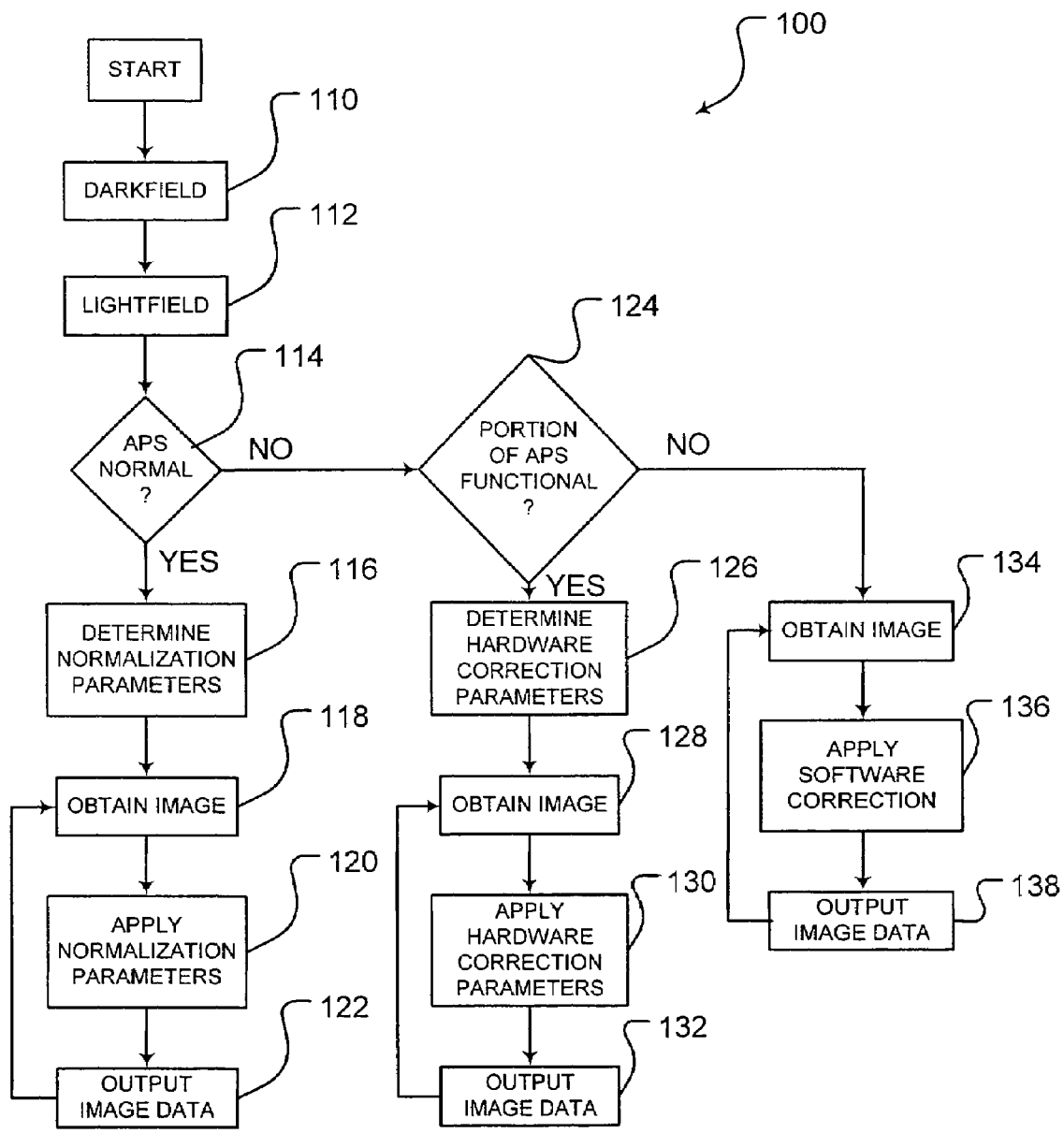
FIG. 6 is a schematic block diagram of a method of imaging system defect correction in accordance a particular embodiment of the invention; and, FIG. 7 is a schematic block diagram of a particular embodiment of a correction method for estimating the output values of defective subpixels in a color digital imaging system.

FIG. 6 depicts a method 100 of obtaining image data from a particular pixel in accordance with a particular embodiment of the invention. Blocks 110 and 112 involve obtaining darkfield and lightfield images. As discussed above, the darkfield and lightfield images allow a decision to be made as to whether any portion of the APS circuit is defective (block 114). If the APS circuit is functioning normally, then the method proceeds to block 116, where the offset and scaling normalization information is determined from the darkfield and lightfield image as discussed above. An image is then obtained in block 118 and the image data is normalized in block 120. After normalization, the normalized image data is output in block 122. The image data output in block 122 may be output to memory or to a display of some type, for example. After the image data is output in block 122, the process may loop back to block 118 where another image may be obtained.

If, after the darkfield and lightfield images of blocks 110, 112, it is determined (in blocks 114 and 124) that one portion of the APS circuit is functioning, but that the other portion of the APS circuit is defective, then the correction offset and correction scaling parameters required for hardware correction are determined in block 126. The correction offset and correction scaling parameters are determined from the lightfield and darkfield images as discussed above. An image is then obtained in block 128 and the hardware correction is applied to the image data in block 130. The application of the hardware correction may involve subtracting the correction offset parameter and multiplying by the correction scaling parameter. The correction offset and correction scaling parameters may be modified using formulas or lookup tables to compensate for any variation of the correction parameter(s) with device and/or circuit parameters. After hardware correction, the corrected image data is output in block 132. The process may then loop back to block 128 where another image may be obtained.

If, after the darkfield and lightfield images of blocks 110, 112, it is determined (in blocks 114 and 124) that both portions of the APS circuit are defective, then an image is obtained in block 134 and software correction is applied to the image data in block 136. Preferably, the software correction of block 136 is based on the output image data from the pixels neighboring the defective APS circuit and is performed according to an algorithm having the form of equation (3). The software correction of block 136 may also be performed by a simple averaging algorithm having the form of equation (1) or a weighted averaging algorithm. The corrected image data is then output in block 138. The process may then loop back to block 134 where another image may be obtained.

Figure 5:
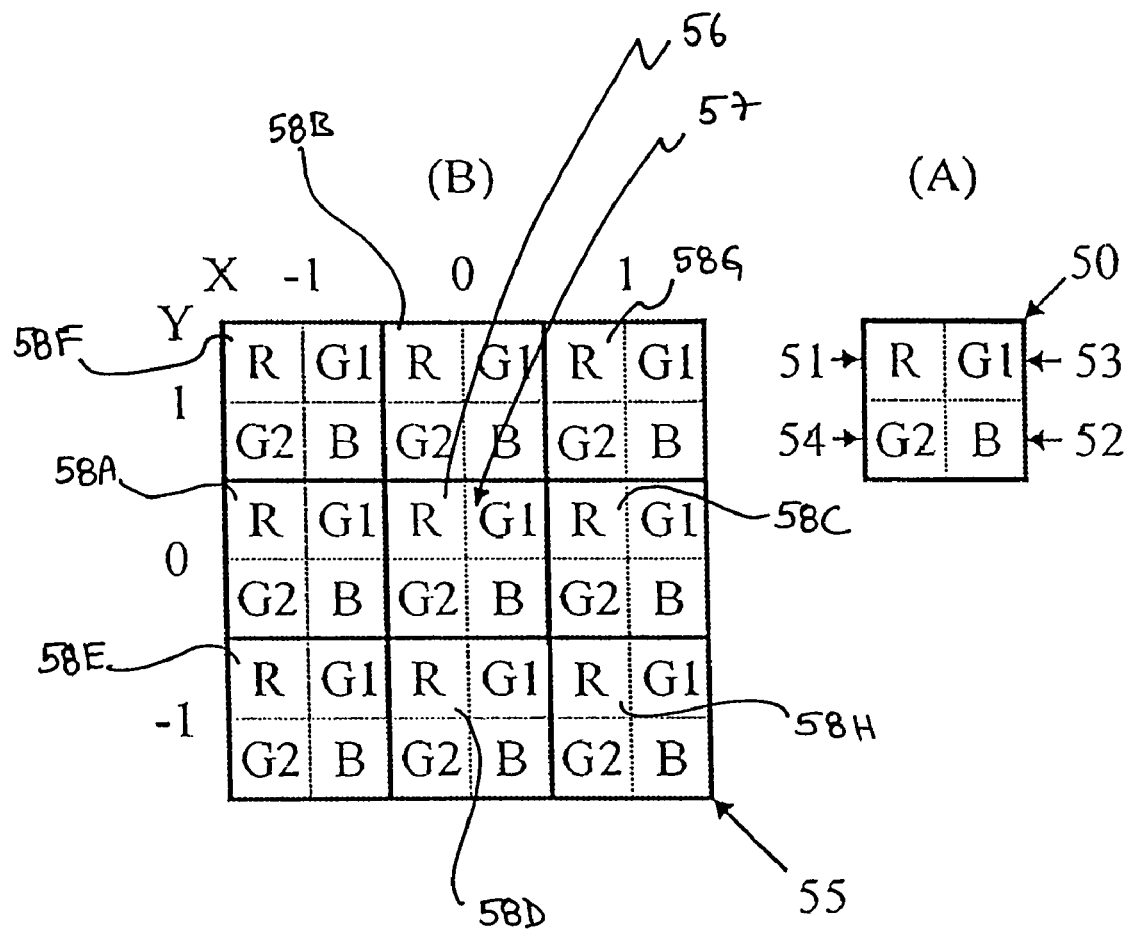

The description provided above has focused on monochrome or gray scale digital imaging systems (i.e. black and white imaging systems). One common method of providing a color digital imaging system involves partitioning each pixel into Red (R), Green (G) and Blue (B) subpixels. FIG. 5A schematically depicts a common method of providing a color digital imaging system, wherein each pixel 50 comprises four subpixels 51, 53, 52, 54 having colors R, G, B, G respectively. Those skilled in the art will appreciate color pixels may be formed from a variety of layouts of different colored subpixels and that FIG. 5 and the color software correction methods described herein may be modified to apply to these alternative color pixel layouts.

When a subpixel of a certain color is defective, the software correction methods described above may be applied by considering only subpixels of colors corresponding to that of the defective subpixel. For example, referring to FIG. 5B, where a R subpixel 56 is defective, then the software correction schemes discussed above may be applied using data from the 8 nearest neighboring R colored subpixels 58A-58H. Such software correction may generally involve a simple averaging algorithm having the form of equation (1), a weighted averaging algorithm, or a more sophisticated software correction method having the form of equation (3).

Another aspect of the present invention involves superior color software correction methods which take advantage of two principles: (i) all of the subpixels are independent from one another, where a subpixel corresponding to a particular color is defective, information may still be obtained from the subpixels corresponding to the other colors; and (ii) in most image scenes, the spatial variation in color is relatively slow in comparison to the spatial variation in luminosity.

Usually, all of the colored subpixels of a color digital imaging system are independent from one another. When a failure occurs, it is most likely to affect only one color (i.e. one particular subpixel) and not the immediately adjacent subpixels of the other colors. Accordingly, incorporating data from the functional subpixels of the other colors may provide significant advantages for color software correction interpolation, as explained further below.

In most imaging applications, the luminosity or brightness of an image changes much faster than its color. Fox example, for a typical image, the spatial variation of the color is near uniform or changes relatively smoothly and slowly, but the spatial variation of the luminosity changes relatively quickly. Although there will be boundaries between objects in the image where the variation in color is sharp, these rapid variations in color will be much less common than similarly rapid variations in luminosity.

Prior to explaining the color software correction methods of the present invention, it is useful to briefly explain some aspects of color theory. These aspects of color theory are explained comprehensively in Wyszecki and Stiles, Color Science: Concepts and Methods, Quantitative Data and Formula (2nd edition), John Wiley & Sons, 1982, which is hereby incorporated by reference.

Numerical parameters may be specified for the colors of a digital imaging system. Those skilled in the art will appreciate that there are many techniques for assigning numerical parameters to the colors of a digital imaging system. For the purpose of explanation of this particular example embodiment, the CIE (Commission Intenationale de l'Eclairage) 1931 standard color model is used. CIE 1931 standard color model has the advantageous characteristic that the luminosity and color may be separately specified using the Tristimulus and Chromaticity color coordinates. The CIE 1931 standard color standard starts by taking the RGB colors from the digital imaging system and relating these colors to Tristimulus values X, Y, Z. The Tristimulus values X, Y, Z contain both color and luminosity information. In accordance with the CIE 1931 color standard system, the relationship between the RGB colors and the Tristimulus values X, Y, Z involves the system of equations (4) shown below and a set of conversion parameters T, also called a "Tristimulus matrix" or a "T matrix".

$$X=T(rx)R+T(gx)G+T(bx)B$$

$$Y=T(ry)R+T(gy)G+T(by)B$$

$$Z=T(rz)R+T(gz)G+T(bz)B$$

$$X+Y+Z=T(rt)R+T(gt)G+T(bt)B \quad \text{Equation (4)}$$

The elements of the T matrix depend on the color filters used in a particular color imaging system. As such, the elements of the T matrix for a particular color imaging system are best obtained by measurements of the optical characteristics of the spectral response for the particular color imaging system being used. The RGB colors may also be related to the Tristimulus values X, Y, Z by the "color coefficients matrix" C, as shown in equation (5). The color coefficients matrix C is simply the inverse of the T matrix.

$$R=C(rx)X+C(ry)Y+C(rz)Z$$

$$G=C(gx)X+C(gy)Y+C(gz)Z$$

$$B=C(bx)X+C(by)Y+C(bz)Z$$

$$R+G+B=C(tx)X+C(ty)Y+C(tz)Z \quad \text{Equation (5)}$$

For the purposes of illustrating this example embodiment, the standard CIE color filters are used, where the Red filter is 700 nm, the Green filter is 546.1 and the Blue filter is 435.8 nm. Table 1 sets out the elements of the T matrix which result from this selection of color filters and the corresponding elements of the color coefficient matrix C are set out in Table 2. The data in Tables 1 and 2, which is taken from Clulow (1972), relates to the particular example described herein where the standard CIE filters are used. The elements of the T matrix will vary depending on the color filters used in a particular digital imaging system.

TABLE 1

Tristimulus matrix values for R-700 nm, G-546.1 nm and B-435.8 nm

| $R_{CIE}$ | $G_{CIE}$ | $B_{CIE}$ | CIE (total) |
|---|---|---|---|
| 0.7347 | 0.2653 | 0 | 1.0000 X |
| 0.2738 | 0.7174 | 0.0088 | 1.0000 Y |
| 0.1666 | 0.0089 | 0.8245 | 1.0000 Z |
| 1.1751 | 0.9916 | 0.8333 | 3.0000 X + Y + Z |

TABLE 2

Color coefficient matrix values for R-700 nm, G-546.1 nm and B-435 nm

| X | Y | Z | Ttotal |
|---|---|---|---|
| 1.5771 | −0.5833 | 0.0062 | 1 R |
| −0.5981 | 1.6153 | −0.0172 | 1 G |
| −0.3122 | 0.1004 | 1.2118 | 1 B |
| 0.6668 | 1.1324 | 1.2008 | 3 R + G + B |

Those skilled in the art will recognize (from equations (4) and (5) and from the matrix representations of Tables 1 and 2), that for the standard CIE color filters, the Tristimulus values X, Y, Z do not represent pure RGB colors, but rather comprise combinations of all colors. The Tristimulus values X, Y, Z exhibit this characteristic because almost all real colors comprise a mixture of more than one of the RGB colors.

The Tristimulus values X, Y, Z contain information related to both color and luminosity. In particular, the Tristimulus value Y contains luminosity information. To accurately compare colors alone, a coordinate system that does not include luminosity information is required. The CIE Chromaticity coordinate system has such a characteristic. The CIE Chromaticity coordinate system was created such that Chromaticity coordinates x, y, z represent pure color values. In CIE Chromaticity coordinates, ideal pure white is x=y=z=0.3333. The Chromaticity coordinates x, y, z are related to the Tristimulus values X, Y, Z via the relationship of equation (6).

$$x=X/(X+Y+Z)$$

$$y=Y/(X+Y+Z)$$

$$z=1-x-y \quad \text{Equation (6)}$$

The Chromaticity coordinates x, y, z specify specific colors and are independent of luminosity. For example, as mentioned above, the color white has the Chromaticity coordinates x=y=z=0.3333. Other shades of white (i.e. from pure white, to shades of gray to black) will have the same Chromaticity coordinates. The same is true for the Chromaticity coordinates for color other than white. However, the same color under different luminosity intensities will have different Tristimulus values X, Y, Z and also different RGB parameters. While there are many actual colors that exist which lie outside of the RGB relationship, the CIE system 1931 color standard system defines all possible colors, and makes them easy to relate.

Figure 7:
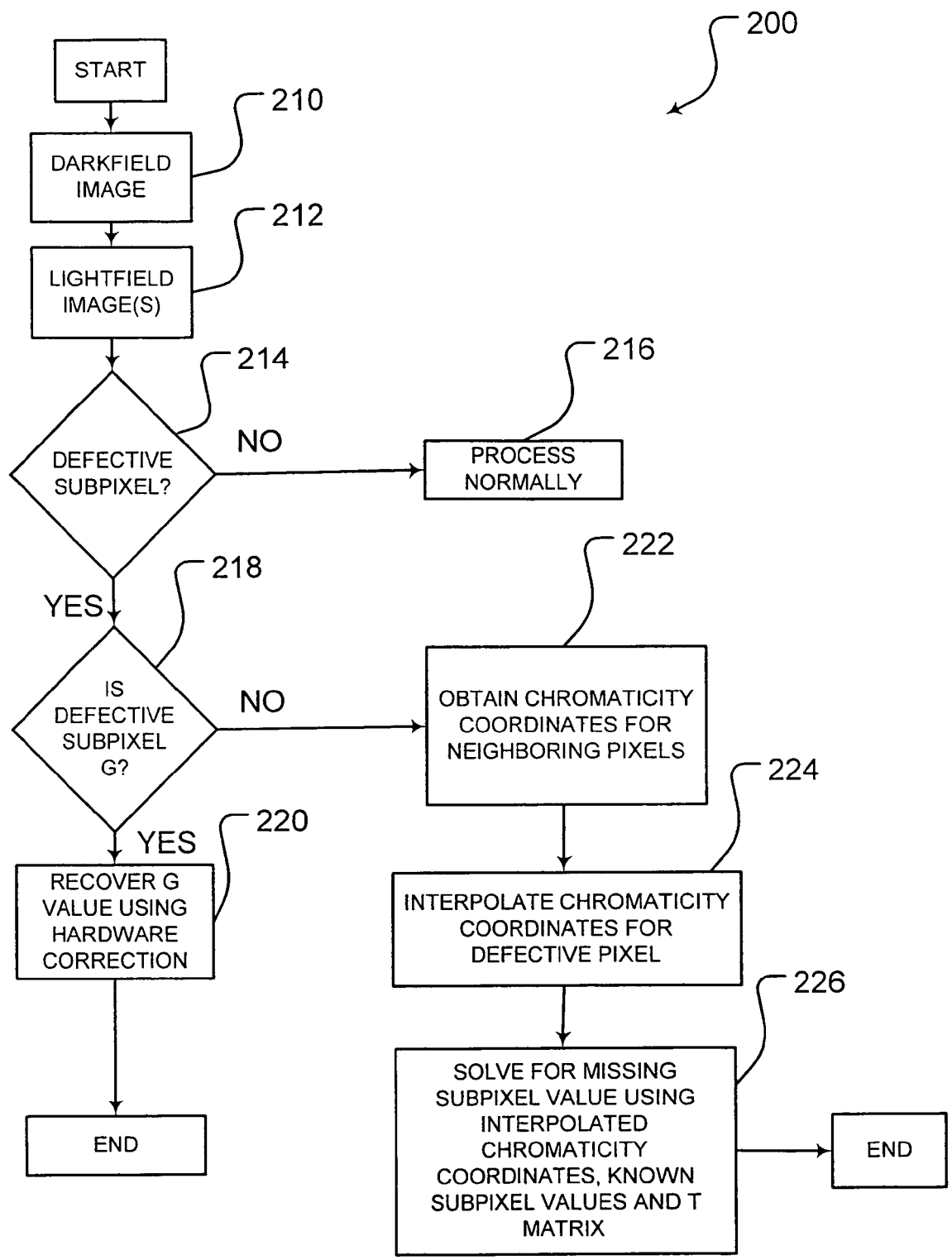

FIG. 7 schematically depicts a particular embodiment of a correction method 200 for estimating the values of defective subpixels in a color digital imaging system. Correction method 200 assumes that each pixel has the layout of pixel 50 (FIG. 5A), with R, G1, B and G2 subpixels 51, 53, 52 and 54 respectively. Defective subpixels are identified using a darkfield image in block 210 and one or more lightfield images in block 212. Lightfield image(s) for color imaging systems (block 212) may be different than the monochromatic lightfield images discussed above. A separate lightfield image may be applied for each of the RGB subpixels. Alternatively, a color balanced lightfield image may be applied to yield maximum output values for each of the RGB subpixels. Those skilled in the art will appreciate that color lightfield images of this nature will yield the same information as the monochromatic lightfield images discussed above, except that the color lightfield images provide information about individual colors (i.e. individual subpixels). A pixel is identified as faulty in block 214 if any one or more of its subpixels is defective. If none of the subpixels are defective, then the pixel is processed normally in block 216.

A defective G subpixel represents a special case, because it is assumed that each pixel 50 comprises two G subpixels 53, 54 (see FIG. 5A). If it is determined (in blocks 214 and 218) that there is a defective G subpixel, then the correct G value for the defective subpixel is recovered using a hardware-based correction technique in block 220. Depending on how the circuit is designed, output from both G subpixels may be separately available, or the output from the two G subpixels may be combined. If output from both G subpixels is separately available, then a failure in a particular G subpixel may be overcome by using only data from the function G subpixel. In such cases, correction method 200 is complete for that pixel, provided that there are no defects in the other subpixels. If the output from both G subpixels is combined in the circuit, then an offset and scaling hardware correction method similar to that used for hardware correction of the split APS circuit may be used to correct for the defective G subpixel. For example, if a G lightfield image indicates that the output level is only 50% of what is expected (i.e. because one of the G subpixels is defective), then the pixel output may be remedied by scaling the G output by a factor of 2. Once again, a correction method 200 is complete for the pixel, unless there are defects in the other subpixels.

If it is determined (in block 214) that there is a defective subpixel and it is determined (in block 218) that the defective subpixel is not a G subpixel, then a color software correction method is performed in blocks 222, 224 and 226 to estimate the value of the defective subpixel. A particular example is used for the purpose of explaining the color software correction methods of the present invention. It is assumed that there is a defective R subpixel 56 contained within an otherwise functional pixel 57 (see FIG. 5B). Pixel 57 is surrounded by its 8 nearest neighboring pixels.

In block 222, the Chromaticity coordinates x, y, z (and/or the Tristimulus values X,Y,Z) are obtained for the pixels which are the nearest neighbors of defective pixel 57. It is assumed for the purposes of explanation, that the pixels neighboring defective pixel 57 are functional and have known RGB values. The Tristimulus values X, Y, Z for the neighboring pixels may then be obtained from the known RGB values of the neighboring pixels and the T matrix using equation (4). The Chromaticity coordinates x, y, z for the neighboring pixels may be obtained from the Tristimulus values X, Y, Z using equation (6). In this example embodiment, the 8 nearest neighbor pixels are used. Larger or smaller numbers of neighboring pixels may also be used.

After determining the Chromaticity coordinates x, y, z (and/or the Tristimulus values X, Y, Z) for the neighboring pixels in block 222, the Chromaticity coordinates x, y, z (or the Tristimulus values X, Y, Z) are interpolated (in block 224) to estimate the Chromaticity coordinates x, y, z (or the Tristimulus values X, Y, Z) for defective pixel 57. Such interpolation is performed separately for two of the Chromaticity coordinates (for example x, y) or for two of the Tristimulus values (for example X, Y). The third Chromaticity coordinate (or the third Tristimulus value) may be calculated using equation (6), if required. Interpolation of the Chromaticity coordinates (or the Tristimulus values) may involve any of the interpolation techniques described above for the monochrome device (e.g. simple averaging of the form of equation (1), weighted averaging or Taylor series interpolation of the form of equation (3)). The Taylor series interpolation method having the form of equation (3) has been found to be particularly effective where the f values are replaced by the Chromaticity coordinate (or the Tristimulus value) of interest.

Once the Chromaticity coordinates (or the Tristimulus values) have been interpolated for the defective pixel 57, the output value for defective R subpixel 56 may be accurately estimated in block 226 using the interpolated Chromaticity coordinates (or the interpolated Tristimulus values), the elements of the T matrix and the known G and B output values for the functional subpixels of the defective pixel 57.

Equation (6) may be rewritten as follows:

$$X+Y+Z=X/x=Y/y=Z/z \quad \text{Equation (7)}$$

The estimated value for defective R subpixel 56 may be determined, for example, by substitution of equation (4) into equation (7) yielding.

$$R = \frac{\left[G\left(\frac{T(gy)}{y} - \frac{T(gx)}{x}\right) + B\left(\frac{T(by)}{y} - \frac{T(bx)}{x}\right)\right]}{\left(\frac{T(rx)}{x} - \frac{T(ry)}{y}\right)} \quad \text{Equation (8)}$$

Similar equations may be derived from the cases where there are defective G or B subpixels. For example, an estimate of the value of the G subpixel may be obtained from equations (4) and (7) by solving for G in terms of the R and B values, the Chromaticity coordinates and the elements of the T matrix (equation (8a)), and the value of the B subpixel may be obtained by solving for a B in terms of the R and G values, the Chromaticity coordinates and the elements of the T matrix (equation (8b)).

$$G = \frac{\left[R\left(\frac{T(ry)}{y} - \frac{T(rx)}{x}\right) + B\left(\frac{T(by)}{y} - \frac{T(bx)}{x}\right)\right]}{\left(\frac{T(gx)}{x} - \frac{T(gy)}{y}\right)} \qquad \text{Equation (8a)}$$

$$B = \frac{\left[R\left(\frac{T(ry)}{y} - \frac{T(rx)}{x}\right) + G\left(\frac{T(gy)}{y} - \frac{T(gx)}{x}\right)\right]}{\left(\frac{T(bx)}{x} - \frac{T(by)}{y}\right)} \qquad \text{Equation (8b)}$$

Equations similar to equations (8), (8a) and (8b) may be easily derived using the Tristimulus values X, Y in place of the Chromaticity coordinates x, y. Other formulas for estimating the value of the defective R subpixel 56 may be derived from equations (4)-(7). In particular, similar equations may be derived wherein the value of the defective R subpixel may be estimated from only one other subpixel value (e.g. the G subpixel value). Such techniques (i.e. where the defective subpixel value is estimated using only one other subpixel value) are useful in cases where the value of a particular pixel is low. For example, Table 1 suggests that for colors that are mostly pure R, the B color has only a low value. In such cases, it may be preferable to estimate the value of a defective R subpixel on the basis of the G subpixel value alone. Techniques where a defective subpixel value may be estimated using only one other subpixel value may also be useful in cases where a particular pixel contains more than one defective subpixel. Method 200 only considers one pixel and assumes that there is, at most, only one defective subpixel. Those skilled in the art will appreciate that method 200 may be modified to involve looping, which may allow consideration of defects in other pixels and/or pixels having more than one defective subpixel.

Two special cases should be noted in the example method described above. Assuming once again, that there is a defective R subpixel 56 (FIG. 5B), any solutions that yield R<0 should be replaced with R=0. Secondly, any solution that yield R>max (e.g. 255 for 8 bit digital resolution) should be replaced with R=max. Both of these corrections come from the possibility of the interpolation (in block 224) yielding Chromaticity coordinates (or Tristimulus values) that are not exact.

Simulations show that the color software correction method described above can recover highly accurate estimates of defective subpixel values, even under conditions where the luminosity is rapidly changing. Estimations of defective subpixel values obtained using this color software correction method have significantly improved accuracy over estimations obtained using averaging-based interpolation methods on the neighboring subpixels having the same color as the defective subpixel. Simulations also demonstrate that the use of the Taylor series interpolation techniques described above (i.e. interpolation having the form of equation (3)) on the Chromaticity coordinates (or the Tristimulus values) produced improved results over the use of conventional averaging-based interpolation (i.e. equation (1)). In several cases, these simulations indicated that defective subpixel estimations based on Tristimulus values gave slightly better results than the those using the Chromaticity coordinates. Thus, it is preferable to test each imaging system to determine the correct T matrix and whether to use the Tristimulus values or Chromaticity coordinates. Those skilled in the art will recognize the calibration methods required to obtain this information. Such testing may not be required for each individual imaging system. If a number of imaging systems incorporate the imaging sensor, then the tests may be performed once and incorporated into a number of image systems.

Similar algorithms may be developed which use other relationships between the pixel colors. For example, if the ratio Cr(x,y), Cg(x,y) and/or Cb(x,y) between the missing color and the luminosity L=R+G+B can be defined as $$Cr(x,y) = R(x,y)/L(x,y)$$

$$Cg(x,y) = G(x,y)/L(x,y)$$

$$Cb(x,y) = B(x,y)/L(x,y) \qquad \text{Equation (9)}$$

then the color software correction method described above may be modified by calculating these Cr(x,y), Cg(x,y) and Cb(x,y) ratios (in place of the Tristimulus values or Chromaticity coordinates) for the pixels neighboring the defective pixel a by interpolating to estimate Cr(0,0), Cg(0,0) and Cb(0,0) (i.e. the Cr(x,y), Cg(x,y) and Cb(x,y) ratios for the defective pixel). By substituting the estimated Cr(0,0), Cg(0,0) and Cb(0,0) into equation (9), estimates for defective R, G or B subpixel values may be determined according to:

$$R(0,0) \approx \frac{Cr(0,0)[G(0,0) + B(0,0)]}{1 - Cr(0,0)} \qquad \text{Equation (10)}$$

$$G(0,0) \approx \frac{Cr(0,0)[R(0,0) + B(0,0)]}{1 - Cg(0,0)} \qquad \text{Equation (10a)}$$

$$B(0,0) \approx \frac{Cr(0,0)[G(0,0) + B(0,0)]}{1 - Cb(0,0)} \qquad \text{Equation (10b)}$$

Simulations have shown that estimates based on the Tristimulus values and/or Chromaticity coordinates provide better estimates than results based on equations (9) and (10). However, equations (9) and (10) provide acceptable results using significantly reduced calculation resources. Accordingly, there may be implementations where it would be preferable to accept marginally inferior estimation in exchange for simpler computation.

There are other possible relationships between the defective subpixel values and other parameters (such as the non-defective subpixel values, or the hue and saturation, for example). These relationships may be calculated in the neighboring pixels and then interpolated in the defective pixel to recover defective subpixel values in the defective pixel.

As will be apparent to those skilled in the art in the light of the foregoing disclosure, many alterations and modifications are possible in the practice of this invention without departing from the scope thereof. For example:

the invention includes APS circuits comprising other radiation detectors (i.e. other than photodiodes). For example, gated MOS phototransistors may be used in place of the photodiodes. Similarly, if a BiCMOS fabrication technology is used, the sensor may employ a bipolar phototransistors instead of the photodiodes. Other similar photosensitive devices may also be used. These alterative sensors offer tradeoffs in circuit complexity and sensitivity to illumination;

the invention includes APS circuits designed to operate in a manner opposite that described above. Such APS circuits operate by adding charge to the gate(s) of the readout transistor(s) during the pre-charging process. During the subsequent imaging process, the photodiode (s), which conduct current when exposed to radiation, remove the charge from the gate(s) of the readout transistor(s);

individual split APS circuits may comprise more than two "portions". For example, a split APS circuit may comprise three or more photodiodes and three or more corresponding readout transistors;

the component devices in the two portions of a split APS circuit may be of different sizes;

the hardware correction methods described above involving correction scaling and correction offset may be performed on the analog APS circuit output prior to digitization;

the hardware correction methods described above may be performed without subtracting a correction offset parameter or with a correction offset parameter of 0;

the hardware and software correction methods described above (including the example methods 100 and 200) are preferably performed by a controller, which may comprise, for example, an embedded microprocessor, a stand-alone programmable controller, a DSP chip, a computer or the like or a plurality of such devices;

other possible failure modes exist, most of which are variations of the six failure modes set out above. The hardware and/or software correction methods described above may be altered to compensate for these other types of defects. For example, one portion of a split APS circuit 20 may be stuck at an intermediate output level because of trapped charges induced from external sources. Such a defect may be corrected with the hardware-based correction described above by appropriate selection of a correction offset parameter and a correction scaling parameter;

the color software correction methods described above may be used together with the split APS circuits and the hardware-based correction methods described above to obtain even better performance;

those skilled in the art will appreciate that there are many alternative color coordinate systems and color representation schemes, other than the CIE 1931 standard color model. Most of these other color coordinate systems and/or color representation schemes comprise variations or transformations of the T-matrix algorithm. These other formulations may provide improved results in some circumstances. The concepts of the color software correction methods described above may be extended to these alternative color coordinate systems and color representation schemes; and, color imaging system may be implemented using other techniques than those described above. For example, an image may be split into separate spectral bands (e.g. R, G and B), each of which may be directed to a separate pixel array. In such a case, the same pixel location on each array may be combined to form the color pixel. This embodiment may allow the imaging system to have a higher density of pixels. In other color digital imaging systems, images may be time multiplexed. In such systems, the same pixel array is used for all colors, but the pixel array is sequentially exposed to a time sequence of color filtered images. The split APS circuits and the hardware and software correction techniques described above may be easily modified for use in such color imaging systems.

Accordingly, the scope of the invention is to be construed in accordance with the substance defined by the following claims.

What is claimed is:

1. An active pixel sensor imaging device comprising a monolithic semiconductor integrated circuit substrate bearing an array of pixel cells, each pixel cell providing a pixel output signal to a signal output line associated therewith, each pixel cell comprising:

a photosensor comprising at least two independent portions, each independent portion having a sensor output; and, for each of the at least two independent portions, a separate readout circuit coupling the sensor output of the independent portion to the signal output line and being capable of generating an output signal at the signal output line;

wherein the outputs of the separate readout circuits for the pixel cell are connected such that the output signals are combined in an additive manner to produce the pixel output signal.

2. The imaging device of claim 1 wherein the pixel output signal comprises an electrical current in the signal output line.

3. The imaging device of claim 1 wherein each readout circuit comprises a MOS readout transistor, and the sensor output of each of the independent portions is coupled to a gate of the corresponding MOS readout transistor.

4. The imaging device of claim 2 wherein the array comprises a plurality of rows and columns of pixel cells and the device comprises a row-select circuit associated with each pixel cell, each row select circuit comprising a MOS row-select transistor having its source and drain coupled between the signal output line and the outputs of the separate readout circuits.

5. The imaging device of claim 4 wherein the row-select circuit comprises a pair of MOS row-select transistors connected in parallel.

6. The imaging device of claim 2 comprising a reset circuit configured to pre-charge the independent portions of each of the pixel cells to an initial voltage level.

7. The imaging device of claim 6 where the reset circuit comprises a reset transistor having its source and drain coupled between a pre-charge voltage source and each of the independent portions.

8. The imaging device of claim 6 wherein, for each of the pixel cells, the reset circuit comprises a plurality of MOS reset transistors, the MOS reset transistors comprising a first MOS reset transistor having a source and drain coupling a first one of the independent portions to a pre-charge voltage source and a second MOS reset transistor having a source and drain coupling a second one of the independent portions to the pre-charge voltage source.

9. The imaging device of claim 2 comprising a controller configured to identify defective independent portions in the pixel cells by identifying pixel cells in which one or more of the independent portions is stuck at one of: a low output state and a high output state.

10. The imaging device of claim 9 wherein the controller is configured to automatically adjust the pixel output signals to compensate for the defective independent portions.

11. The imaging device of claim 10 wherein the controller is programmed to generate a corrected pixel output signal by scaling the level of the pixel output signal by multiplying the output signal with a correction scaling parameter for pixel cells identified by the calibration system as having one properly functioning independent portion and one independent portion stuck at a low output state.

12. The imaging device of claim 10 wherein the controller is programmed to generate a corrected pixel output signal by subtracting a correction offset parameter from the pixel output signal for that pixel cell to produce a resultant signal and by scaling the resultant signal by multiplying the resultant signal by a correction scaling parameter for pixel cells identified by the calibration system as having one properly functioning independent portion and one independent portion that is stuck at one of: a low output state and a high output state.

13. The imaging device of claim 10 wherein the controller is programmed to generate a corrected pixel output signal by taking one half of the sum of the pixel output signals from four nearest orthogonal neighboring pixel cells and subtracting one quarter of the sum of the pixel output signals from the four nearest diagonal neighboring pixel cells therefrom for pixel cells identified by the calibration system as having all of their independent portions defective.

14. The imaging device of claim 2 wherein the imaging device is a color imaging device and the pixel cells comprise red-sensitive pixel cells, green-sensitive pixel cells and blue-sensitive pixel cells.

15. A method of compensating for defects in an active pixel sensor imaging device comprising an array of pixel cells on a monolithic semiconductor integrated circuit substrate, each pixel cell comprising a photosensor comprising a plurality of independent portions, each independent portion having a sensor output, and for each of the plurality of independent portions, a separate readout circuit coupling the sensor output of the independent portion to the signal output line and being capable of generating an output signal at the signal output line; the method comprising:
    exposing the array of pixel cells to one or more known illumination levels, each independent portion of each pixel cell providing a sensor output signal in response thereto;
    carrying the sensor output signals from the independent portions of one of the pixel cells to a signal output line by way of mutually independent signal paths, each of the signal paths provided by a corresponding one of the separate readout circuits;
    additively coupling the sensor output signals from the separate readout circuits to the signal output line so that the signal output line carries a pixel output signal comprising a sum of the sensor output signals;
    measuring the pixel output signal; and,
    based upon the pixel output signal, determining whether one or more of the independent portions is stuck at an output state.

16. The method of claim 15 comprising:
applying a darkfield image to the array of pixel cells;
    for each of the pixel cells, measuring a darkfield illumination value of the pixel output signal and determining an offset parameter which, when subtracted from the darkfield illumination value, results in a zero signal; and,
    identifying a first group of one or more defective pixel cells, being those pixel cells having offset parameters which are not near zero, as pixel cells having one or more independent portions stuck at non-zero output states.

17. The method of claim 16 comprising:
illuminating the array of pixel cells with a lightfield image;
for each of the pixel cells, measuring a lightfield illumination value of the pixel output signal; and,
identifying a second group of defective pixel cells, being those pixel cells having lightfield illumination values that are below an expected lightfield illumination value, as having one or more independent portions stuck at low output states.

18. The method of claim 17 comprising, for each pixel cell having at least one properly functioning independent portion and at least one defective independent portion stuck in an output state, generating a pixel output signal correction function by:
    subtracting the offset parameter associated with the pixel cell from the lightfield illumination value of the pixel output signal to produce a resultant signal and determining a scaling parameter which, when multiplied with the resultant signal, results in a sensor output corresponding to the lightfield image;
    wherein the pixel output signal correction function comprises subtraction of the offset parameter associated with the pixel cell from the pixel output pixel signal and multiplication of a result of the subtraction by the scaling parameter associated with the pixel cell.

19. The method of claim 15 comprising correcting output signals from the pixel cells by applying a first correction to the pixel output signals of those pixel cells identified as having one independent portion stuck at a low output state and a second correction to the pixel output signals of those pixel cells identified as having one independent portion stuck in a high output state.

20. The method of claim 15 comprising, for each pixel cell having all of its independent portions defective, generating a corrected pixel output signal by computing an average of pixel output signals from neighboring pixel cells.

21. The method of claim 15 comprising, for each pixel cell having all of its independent portions defective, generating a corrected pixel output signal from the eight nearest neighboring pixel cells by:
    taking one half of the sum of the pixel output signals from the four nearest orthogonal neighboring pixel cells; and,
    subtracting one quarter of the sum of the pixel output signals from the four nearest diagonal neighboring pixel cells therefrom.

22. The method of claim 15 wherein the array of pixel cells of the imaging device comprise an array of composite color pixels, each composite color pixel comprising at least one each of red, green and blue subpixels and wherein at least one defective composite color pixel comprises a defective subpixel, the method comprising:
    determining a set of color coordinates for each of a plurality of composite color pixels neighboring the defective composite color pixel;
    individually interpolating an estimated set of color coordinates for the defective composite color pixel based on the color coordinates for the composite color pixels neighboring the defective composite color pixel; and,
    determining a value for the defective subpixel based on the estimated set of color coordinates and a value of at least one functional subpixel within the defective composite color pixel.

23. The method of claim 22 wherein individually interpolating the estimated set of color coordinates for the defective composite color pixel comprises, for each color coordinate:
    taking one half of the sum of the corresponding color coordinate for the four nearest orthogonal neighboring composite color pixels; and,
    subtracting one quarter of the sum of the corresponding color coordinate for the four nearest diagonal neighboring composite color pixels therefrom.

24. The method of claim 22 wherein the color coordinates comprise at least one of: the Tristimulus values and the Chromaticity coordinates.

25. The method of claim 22 wherein each of the composite color pixels comprises two green pixel cells, a blue pixel cell and a red pixel cell.

26. The method of claim 25 comprising determining that one of the green pixel cells in a composite color pixel has failed and replacing the output of the failed green pixel cell with the output of the other green pixel cell.

27. The method of claim 15 wherein the pixel cells of the imaging device provide an array of composite color pixels with at least one defective composite color pixel, each composite color pixel comprising at least one each of red, green and blue pixel cells, the method comprising:

determining a luminosity value and a color value for each composite color pixel, wherein the luminosity value comprises a sum of the pixel output signals from the red, green and blue pixel cells, and wherein the color value comprises a ratio of the pixel output signals from the red, green and blue pixel cells; and, for each defective composite color pixel:

determining which of the red, green and blue pixel cells are producing incorrect pixel output signals;

determining an expected color value for the defective composite color pixel by applying an estimation algorithm to the color values from the nearest neighboring composite color pixels;

determining an expected luminosity value for the defective composite color pixel by applying an estimation algorithm to the luminosity values from the nearest neighboring composite color pixels; and determining a value for a defective red, blue or green color cell based on the expected color value and expected luminosity value.

28. The method of claim 27 wherein determining the luminosity value and the color value for each composite color pixel comprises computing Tristimulus values for the composite color pixel.

29. The method of claim 28 comprising computing Chromaticity coordinates from the Tristimulus values.

30. The method of claim 27 wherein applying an estimation algorithm to the color values from the nearest neighboring composite color pixels comprises interpolating one of: the Tristimulus values and the Chromaticity coordinates for a plurality of nearest neighboring composite color pixels.

31. A method according to claim 18 comprising operating the imaging device to acquire an image and correcting the acquired image by applying to each of one or more of the pixels of the acquired image the pixel output signal correction function corresponding to the pixel of the acquired image.

32. The method of claim 15 comprising:

applying a darkfield image to the array of pixel cells, for each of the pixel cells, measuring a darkfield illumination value of the pixel output signal and determining an offset parameter which, when subtracted from the darkfield illumination value, results in a zero signal;

illuminating the array of pixel cells with a lightfield image, for each of the pixel cells, measuring a lightfield illumination value of the pixel output signal; and, for at least one of the pixel cells generating a pixel output signal correction function by:

subtracting the offset parameter associated with the pixel cell from the lightfield illumination value of the pixel output signal to produce a resultant signal and determining a scaling parameter which, when multiplied with the resultant signal, results in a sensor output corresponding to the lightfield image;

wherein the pixel output signal correction function comprises subtraction of the offset parameter associated with the pixel cell from the pixel output pixel signal and multiplication of a result of the subtraction by the scaling parameter associated with the pixel cell.

33. A method according to claim 32 comprising operating the imaging device to acquire an image and correcting the acquired image by applying to each of one or more of the pixels of the acquired image the pixel output signal correction function corresponding to the pixel of the acquired image.

* * * * *